United States Patent [19]

Shuler et al.

[11] 3,844,358
[45] Oct. 29, 1974

[54] FOLDING SYSTEM FOR MULTI-SECTIONAL IMPLEMENT

[76] Inventors: F. William Shuler, 1110 Jubillee Dr.; John Dyck, 840 6th Ave., both of Swift Current, Saskatchewan, Canada

[22] Filed: May 11, 1973

[21] Appl. No.: 359,538

[30] Foreign Application Priority Data
Feb. 16, 1973 Canada .............................. 163904

[52] U.S. Cl. .............................. 172/311, 172/456
[51] Int. Cl. ............................................ A01b 15/14
[58] Field of Search ........... 172/310, 311, 451, 452, 172/456; 280/411 R, 412, 413

[56] References Cited
UNITED STATES PATENTS 3,321,028  5/1967  Groenke .............................. 172/311
3,401,752  9/1968  Nja .................................. 172/456 X
3,669,195  6/1972  Green et al. ......................... 172/311

Primary Examiner—Robert E. Pulfrey
Assistant Examiner—Paul T. Sewell
Attorney, Agent, or Firm—Cushman, Darby & Cushman

[57] ABSTRACT

A method and means of folding a multi-section field machine, such as agricultural implements, which require a reduction in width for or during transportion. A series of strategically placed hydraulic rams serve to fold sections of the implement, in stages, to folded positions of at least 90°.

2 Claims, 6 Drawing Figures

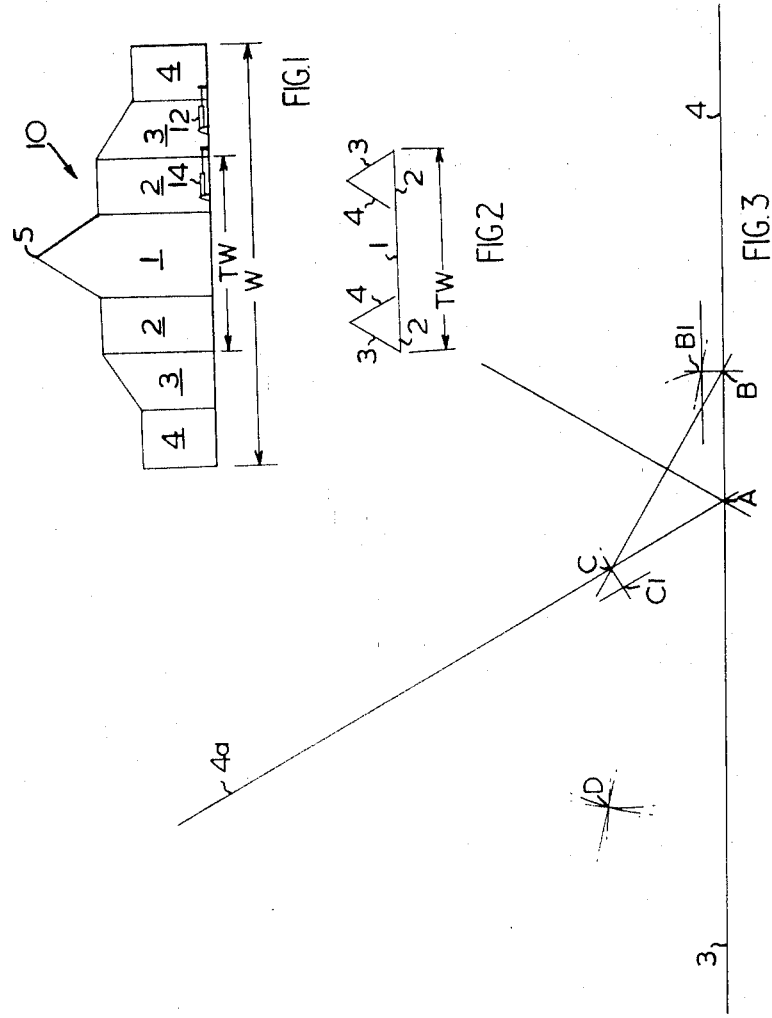

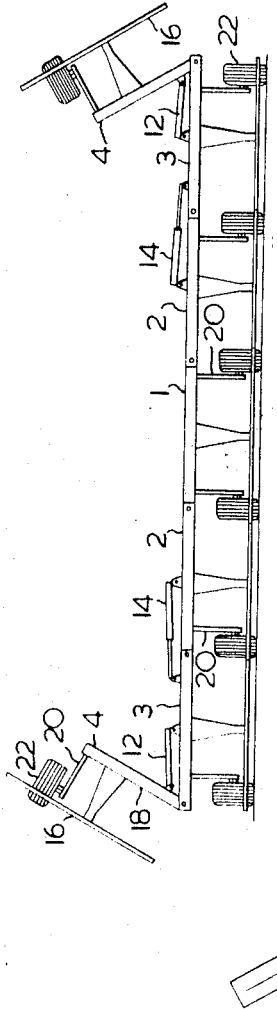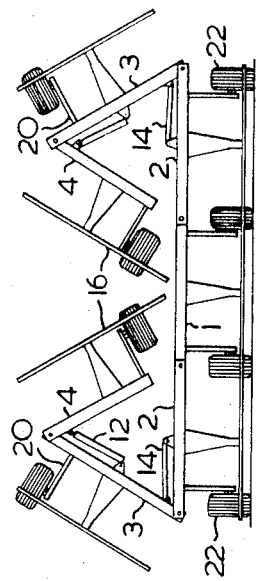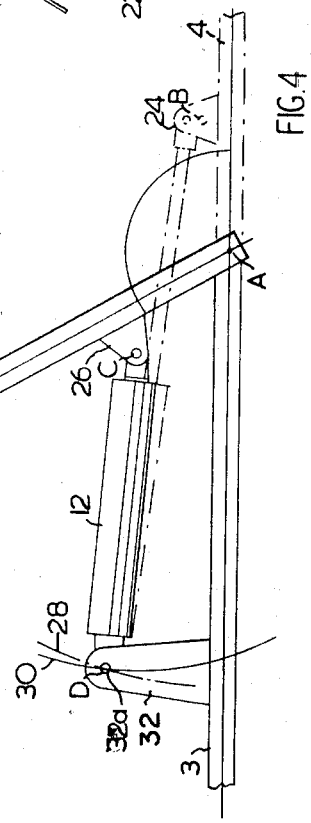

FOLDING SYSTEM FOR MULTI-SECTIONAL IMPLEMENT

This invention relates to sectional, mobile field machines of the type having their sections hinged together for folding purposes. In particular, the invention relates to a system of folding sectional machines from an open, operating position to a closed, folded position for transport.

There are numerous forms of mobile field machines or devices which utilize sectionalized frames wherein the sections are hinged together either for quick disassembly or for folding so that they can be moved on public roads from one area to another. The examples of such devices are mobile cranes, mobile derrick platforms, wide, sectional agricultural machines, and the like.

One example of the prior art in this field is U.S. Pat. No. 3,321,028 to Groenke of May 23, 1967. This patent discloses mechanism for folding agricultural implements, but, like most known devices of this type, the main folds do not go beyond 90°. Moreover, when the machine is completely folded, it is secured together by a winged nut and bolt. Most devices, such as in the Groenke patent, use a series of cables, telescoping pipes, gravity return to transport positions, etc. Obviously, cables can break, and serious damage can result.

The present invention utilizes a series of strategically placed hydraulic rams for folding sections of a mobile device in stages, with each fold being substantially in excess of 90° and substantially beyond 120°. Moreover, in accordance with the system of this invention, double ended folds of sectionalized machines are possible which permits more favourable weight distribution in the transport position with a low, stable profile resulting therefrom.

The system of the present invention is adaptable to any sectional machine although by way of example, the present application will deal with a system as applied to a sectionalized agricultural machine. It is a common belief by those skilled in this art that to fold one section of a sectionalized machine towards or beyond the 120° mark requires at least two hydraulic rams, as the main ram over-centres and it requires one short ram to start unfolding the device. However, in accordance with the present invention, a strategic positioning of the ram and the height of the lugs on the frame therefor allows such folding with the use of only one ram.

In accordance with one aspect of the present invention, the system applies to a multi-sectioned field machine of the type having a plurality of sections pivotally hinged together and the system of folding and unfolding the machine between operating and transport positions comprises positioning a ram on each section adjacent to a section to be folded and orienting the ram generally normal to the pivot hinge axis between the sections. The ram has a cylinder and piston rod with the cylinder being secured to one section and the rod being secured to an adjacent section whereby actuation of the ram folds or unfolds one section with respect to another; the arrangement of the ram and its connection between the sections being such that the ram piston connection does not reach an over-centre point between the folded and unfolded positions of the machine section; and whereby at least two successive folds can be made at each terminal end of the field machine and wherein each fold may be substantially in excess of 90°.

The invention will be described by way of examples with reference to the accompanying drawings in which:

FIG. 1 is a schematic plan view of a foldable, sectionalized machine;

FIG. 2 is a schematic elevation view of a sectionalized machine showing two folds in the terminal ends thereof;

FIG. 3 is a schematic diagram illustrating the points of connection for a ram and a sectionalized machine;

FIG. 4 is similar to FIG. 2 but shows a ram mounted on a foldable device and illustrates the ram in its extended and contracted positions;

FIG. 5 is a view similar to FIG. 2 but showing a first fold in the terminal ends of the machine;

FIG. 6 is an end view similar to FIG. 5 but showing two folds.

Referring to the drawings, and in particular to FIG. 1, a foldable machine such as an agricultural implement 10 consists of seven separate sections, a center section 1 pivotally and hingedly joined to a first section 2 on either side thereof, each section 2 being similarly joined to an adjacent section 3 which in turn, is joined to a terminal section 4 at each outer end of the implement. The centre section 1 has a hitch point 5 for being towed by a suitable tractor or the like.

Sections 3 and 4 of the machine 10 are foldable sections which, when moved to a folded or transport position reduce the width of the machine from W as shown in FIG. 1 to TW, approximately half its open or operating width. To effect this folding, each section 3 is provided with a hydraulic ram 12 which is connected at its piston rod end to section 4 and section 2 is also provided with a ram 14 connected at its piston rod end to section 3. When folding the machine to the transport position, shown schematically in FIG. 2 and full in FIG. 5, ram 12 is actuated thereby folding section 4 inwardly relatively to section 3 to approximately 120°. Subsequently, as shown in FIG. 2 and FIG. 6, ram 14 is actuated drawing folded sections 3 and 4 inwardly with respect to section 2, the angle between sections 2 and 3 being approximately 120° whereby the folded configuration is substantially that of FIGS. 2 and 6.

The angle of fold of the machine section depends upon the environment in which the machine is working and what accessories, if any, that the sections hold. In the implement shown in FIGS. 5 and 6 for example, each section is provided with a tilling blade 16 detachably secured to the section frame 18. The latter also includes a suspension member 20 supporting a pneumatic tire 22. It will be observed from FIG. 6 that the inward double folding of sections 3 and 4 is roughly the limit of inward folding because of the interference between the tilling blade 16 with the frame section if further folds were to be made. However, it will be appreciated that if the centre section 1 is wide enough and if the tilling blades were removed from their associated frame sections or if a different type of tool was being carried by the sections, a further fold could be made to the sections 2 inwardly toward the section 1. The angle selected for the fold therefore will vary depending upon the accessories carried by the frame sections. In the present example, the angle of fold selected is 120° and a ram having a suitable piston travel is then selected to effect the actual folding. A 24 inch ram is an example.

The method of determining the location of the ram is unique and results in the heretofore unobtainable double folding of the machine by single rams as shown in the drawings. By virtue of the positioning of the ram connection points, the above angles of fold are obtainable using only a single ram for each fold and wherein the ram piston end will not reach or exceed an over-centre mark when the foldable section is in either its open or closed position.

The following procedure must be followed to obtain the proper ram connection locations on the adjacent machine sections.

First, the angle of fold of the implement section is chosen in relation to the adjacent unfolded section. This may be less than 90° or, as in the present example, this angle may be 120°. The angles, points of ram connection and section members are shown schematically in FIG. 3 and in full in FIG. 4.

b. The 120° angle between foldable element 4 in its open position and its closed position 4a is sub-divided to provide two 60° angles and the available ram travel, 24 inches is then projected across the 120° angle providing points B and C as shown in FIG. 3. An isosceles triangle is formed between points A, B and C.

c. At the points of intersection B and C on the folded and unfolded positions of the arm, an arc is scribed from the base pivot point A which corresponds to the longitudinal pivot axis of the foldable member.

d. A height then must be selected for the lug to which the ram piston rod will be attached. This height is determined by mechanical necessity, the present example being 3 inches.

This 3 inch height is projected vertically above the base line to provide point B1 and a corresponding 3 inch height point is also positioned above the 120° angle line to provide point C1. This represents the lug point of the ram piston rod in open and folded positions respectively. Obviously, the ram travel of 24 inches should correspond to the distance between the folded and unfolded points B1 and C1.

e. In order to determine the position D of the ram body lug 32, two arcs must be projected and the first is an arc of 24 inches radius corresponding to the maximum travel (plus the length of ram body) taken from point B1, the open or unfolded positions of the piston rod lug 24. This provides arc 28 in FIG. 4.

f. The second arc is taken from point C1 and as this arc is representative of the ram in its closed position, the radius of the second arc from point C1 is equal to length between the extreme points of the ram in its closed position. This provides arc 30.

The point of intersection D of the B1 arc and C1 arc provide the exact location above the base line of section 3 for the location of the ram body lug 32 and specifically the lug connection point 32a.

It will be noted from FIG. 4 and from the comparison of the open and closed positions of the piston lug 24 in relation to the ram body 12 that the piston rod lug 24 and in particular point B1 never reaches or exceeds an "over-centre" point, i.e. a line between points A and D of FIGS. 3 or 4. This is a direct result of the precise positioning of the ram body lug 32 in relation to the implement section to which it is attached, as provided by the previously described locating process.

As shown in FIG. 4, ram 12 is interconnected between its lug 32 on frame section 3 and lug 26 on frame section 4. The open or operating position of the above elements is shown in phantom line with frame section 4 being pivoted to its downward position along its pivotal axis A. When the ram 12 is actuated, frame section 4 is drawn upwardly through a 120° arc to its folded or transport position shown in FIG. 4. In accordance with FIG. 6, a further folding of frame section 3 and 4 with respect to section 2 would be effected by actuation of the second ram 14 shown in FIG. 1.

The embodiments of the invention in which an exclusive property or privilege is claimed are defined as follows:

1. In a multi-sectioned field machine having an inner, towing section and a plurality of outer wing sections pivotally hinged to one another and to at least one side of the towing section, means for folding said wing sections relative to one another and to said towing section between unfolded operating and folded towing positions, each of said folds being in excess of 90°, said folding means for each said section comprising; interconnecting adjacent sections by a hydraulic ram;

pivotally connecting the piston rod end of the ram to one section;

a lug on the adjacent section for securing the body end of the ram thereto;

the length of the ram between extended and retracted positions being great enough to fold the adjacent section beyond 90°; and the height of said ram body lug being sufficient to provide that, between the folded and unfolded positions of said sections, the piston rod end of the ram does not reach an over centre mark with regard to the body end of the ram.

2. In a multi-sectioned field machine having an inner, towing section and a plurality of outer wing sections pivotally hinged to one another and to at least one side of the towing section, a method of determining the location of hydraulic rams interconnecting said sections for folding said wing sections relative to one another between operating and towing positions through angles in excess of 90°, said method comprising:

a. selecting an angle of fold in excess of 90° for each section between its unfolded operating position and its folded transport position with respect to an adjacent section;

b. projecting the available ram travel across the selected angle of fold;

c. securing the piston end of the ram to one section;

d. positioning a lug on the other, adjacent section and securing the body of the ram thereto and e. selecting the height for said ram body lug to provide that, between the folded and unfolded positions of said sections, the piston rod end of the ram does not reach an over centre mark with regard to the body end of the ram.

* * * * *